United States Patent [19]

Rothamel et al.

[11] Patent Number: 5,172,596
[45] Date of Patent: Dec. 22, 1992

[54] PROCESS AND APPARATUS FOR THE INPUT OF PARAMETERS OF A ROTARY MEMBER TO BE BALANCED INTO A BALANCING MACHINE EVALUATION UNIT

[75] Inventors: Karl Rothamel, Darmstadt; Stefan Vollmari, Dierdorf, both of Fed. Rep. of Germany

[73] Assignee: Hofmann Werkstatt-Technik GmbH, Pfungstadt, Fed. Rep. of Germany

[21] Appl. No.: 819,668

[22] Filed: Jan. 13, 1992

Related U.S. Application Data

[63] Continuation of Ser. No. 511,083, Apr. 19, 1990, abandoned.

[30] Foreign Application Priority Data

Jun. 14, 1989 [DE] Fed. Rep. of Germany ....... 3919449

[51] Int. Cl.[5] .............................................. G01M 1/02
[52] U.S. Cl. ....................................... 73/462; 364/508
[58] Field of Search .................. 73/462, 464; 364/508

[56] References Cited

U.S. PATENT DOCUMENTS

| | | | |
|---|---|---|---|
| 4,068,532 | 1/1978 | Green et al. | 73/462 |
| 4,154,112 | 5/1979 | Hofmann | 73/462 |
| 4,267,730 | 5/1981 | Curchod et al. | 73/462 |
| 4,759,217 | 7/1988 | Brihier et al. | 73/462 |

*Primary Examiner*—John E. Chapman
*Attorney, Agent, or Firm*—Cushman, Darby & Cushman

[57] ABSTRACT

A process and an apparatus for the input of parameters of a rotary member to be balanced, such as a vehicle wheel, into an evaluation unit of a balancing machine in which a rotary member to be balanced is mounted on a main shaft and the respective rotary angular positions of the main shaft are monitored in angular steps by means of an angle sensor, and reproduced. For input of the parameters of a rotary member requiring balancing, the main shaft is rotated and signal produced by the angle sensor in the rotary movement of the main shaft is used to alter the respective value of the parameter being displayed, with the main shaft being rotated until the desired value in respect of the parameter in question is displayed.

10 Claims, 1 Drawing Sheet

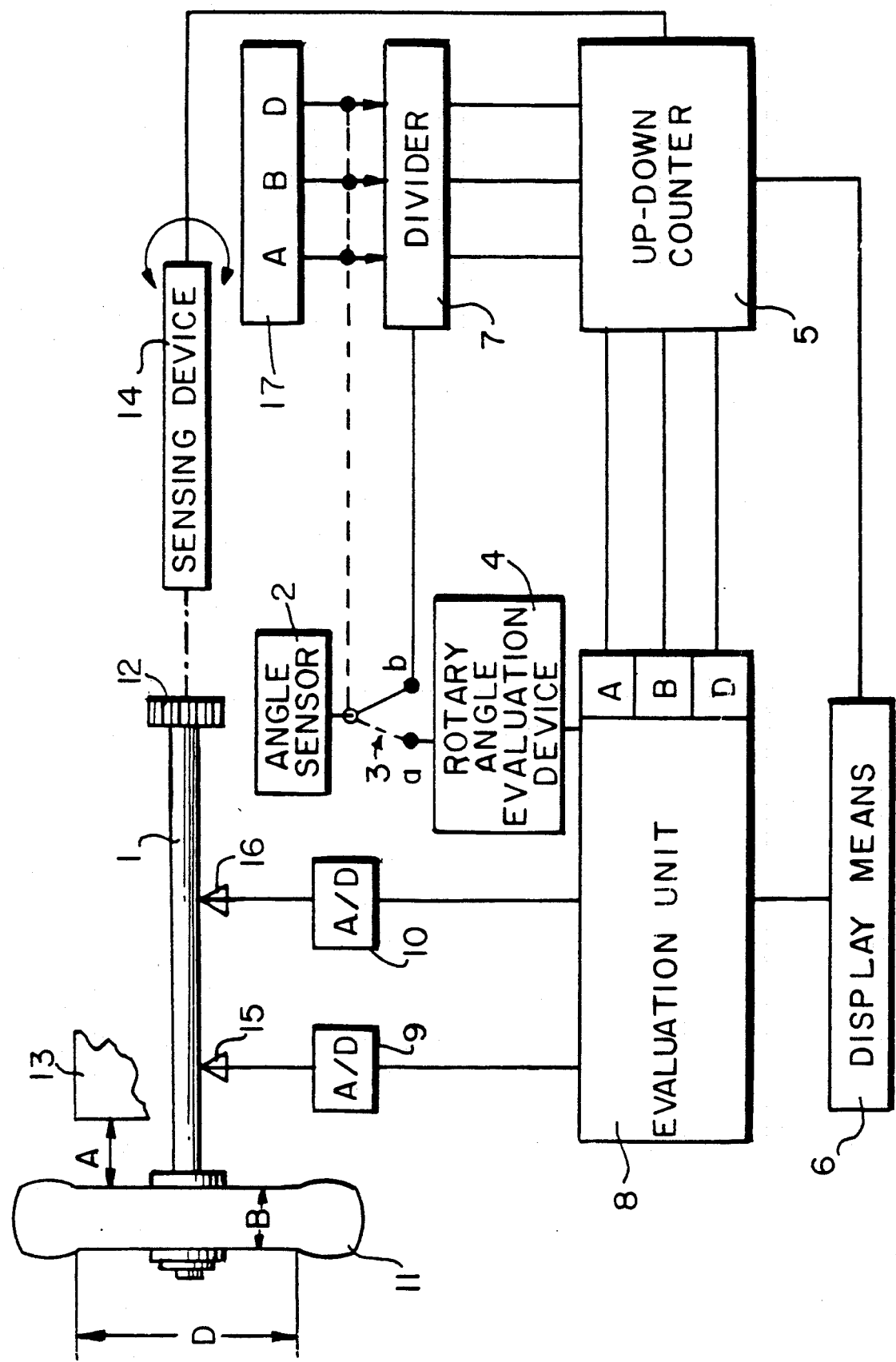

PROCESS AND APPARATUS FOR THE INPUT OF PARAMETERS OF A ROTARY MEMBER TO BE BALANCED INTO A BALANCING MACHINE EVALUATION UNIT

This is a continuation of application Ser. No. 07/51,083, filed on Apr. 19, 1990, which was abandoned upon the filing hereof.

BACKGROUND OF THE INVENTION

The present invention concerns a process and an apparatus for the input of parameters of a rotary member to be balanced, such as a vehicle wheel, into an evaluation device for example of a balancing machine.

In a balancing machine for balancing for example a motor vehicle wheel, the rotary member such as the wheel is clamped on to a main shaft which is caused to rotate, and the respective rotary angular positions of the main shaft are monitored in angular steps by means of an angle sensor or detector, and suitably reproduced. Particularly when balancing motor vehicle wheels in a workshop or service station, data in respect of the wheel to be balanced such as the rim width and the rim diameter as well as the spacing of a rim flange or the spacing of the planes in which balancing weights are to be secured to the rim, from a stationary part of the balancing machine, may be inputted into example in German laid-open application (DE-SO No 27 37 542). The inputs may be in metric units, for example millimetres, or in inches. Those input values are necessary in order to be able to take suitable account of the position of the corresponding balancing planes in which the balancing weights are fitted to the wheel to compensate for unbalance thereof, in the main frame computer of the evaluation unit or, in the event of digital evaluation, in a digital processor.

Those values may be inputted by way of a keyboard, but it is also possible for those values to be inputted by means of potentiometers with suitable scales.

SUMMARY OF THE INVENTION

An object of the present invention is to simplify a process for the input of characteristic values or paramters of a rotary member to be balanced into a balancing machine evaluation unit.

Another object of the invention is to provide a process for the input of parameters of a rotary member requiring balancing into an evaluation means of a balancing apparatus, which involves a reduced amount of apparatus expenditure.

Still another object of the present invention is to provide an improved apparatus for the input of parameters of a rotary member requiring balancing into a balancing machine, which is reliable in operation while affording enhanced simplicity of structure and ease of operation.

In accordance with the present invention, in a first aspect, those and other objects are achieved by a process for the input of characteristic values or parameters in respect of a rotary member to be balanced, such as a motor vehicle wheel, into an evaluation means of a balancing machine in which the rotary member to be balanced is mounted on a main shaft and the respective rotary angular positions of the main shaft are monitored in angular steps by means of an angle sensor and suitably reproduced. To provide for input of the respective parameter of the rotary member to be balanced, the main shaft is rotated and the signal outputted by the angle sensor upon such rotary movement of the main shaft is used to alter the respectively indicated parameter. The main shaft is rotated until the desired value of the parameter is displayed.

Subsequently to that input procedure, for further operation on the rotary member requiring balancing, the indicated value of the parameter is inputted to the evaluation unit such as a digital processor if the evaluation unit operates digitally, and is taken into consideration in the operation of evaluating the unbalance measurement values obtained from the rotary member in question. In that way a plurality of parameters can be inputted in succession. In the case for example of a motor vehicle wheel, the parameters involved may be the wheel rim diameter, rim width and the distance of the rim from a stationary part of the machine.

The invention advantageously makes it possible to eliminate the use of a plurality of keys or a keyboard for inputting the corresponding metric or inch values in respect of the relevant wheel data. In accordance with the invention, the angle sensor which is operatively coupled to the main shaft and which during an unbalance measuring run detects the respective angular position of the main shaft and/or the speed of rotation of the main shaft, may also be used for input of the parameters of the rotary member requiring balancing. The angle sensor may preferably be in the form of an incremental sensor but it is also possible to use an absolute value sensor or a rotary signalling device or synchro unit with synchro-digital converter connected to the output side thereof.

In another aspect of the invention, the foregoing and other objects are achieved by an apparatus for the input of parameters of a rotary member to be balanced, in a balancing machine, comprising a main shaft on which the rotary member to be balanced can be mounted, and an angle sensor which is operatively connected to the main shaft and which is operable to monitor the respective rotary angular position of the main shaft. The apparatus further includes a change-over switching means which is connected to the angle sensor and which connects the output of the angle sensor selectively to a rotary angle evaluation means or a parameter value evaluation means. The parameter value evaluation means includes a counting means which can be set to the respective parameter and which can be connected by way of the switching means to the output of the angle sensor. The parameter value evaluation means further includes a parameter display or indicating means connected to the counting means. The parameter indicating means may be responsive in particular to digital signals.

The parameter indicating or display means may preferably he integrated into the display means which serves to display the measured unbalance values in respect of the corresponding rotary member. The display means may be for example a three-digit 7-segment display device for indicating the parameter values during the input thereof. The same display device may be used after the unbalance measuring run has been carried out to reproduce the unbalance measurement values, for example the unbalance-balancing weights required in relation to a motor vehicle wheel.

When setting the parameter values, it is advantageously possible firstly to specify standard parameter values which frequently occur in relation to the rotary members to be balanced. For example, in relation to a motor vehicle wheel, the standard parameters may be a value of 5½ inches in respect of rim width and 14 inches in respect of rim diameter, being values which are frequently encountered in relation to vehicle wheel rim structures. If motor vehicle wheel which differ therefrom are to be measured, the parameter values can be suitably altered in relation thereto, taking the inputted standard values as the basic starting point. The previously inputted standard values can be increased or reduced to the desired levels, by sensing the direction of rotation of the main shaft and suitable actuation of the counting means which is preferably in the form of an up-down counter. When the desired parameter value is reached, the procedure involving turning the main shaft is concluded.

The parameter value input operation may be such as to prevent accidentally altering the input value when the main shaft is already rotating. For that purpose, it is possible to provide for interrogation of a condition bit which indicates whether the main shaft is or is not moving. For example, it is possible to provide that the instantaneously applicable value of the inputted parameter is displayed by depressing a key. The condition bit which indicates whether the main shaft was already moving when the key was depressed makes it possible to prevent an unintentional alteration in the parameter value display at that time. If the main shaft was already moving when the key was depressed, then the counter condition is not altered at that time. It is only after the main shaft has been immobile for a short time that the counter is enabled. Then, when the key is depressed, that is to say when the counter is enabled, the main shaft can be turned in the appropriate direction to set the desired parameter value.

When inputting parameters in respect of motor vehicle wheels requiring balancing, the parameter values may be altered in ½ inch or millimeter steps, for increasing or reducing the displayed parameter values.

The increments and step sizes as well as the initial and terminal values of the counting means may be easily adapted and matched to the parameters requiring input.

Further objects, features and advantages of the present invention will be apparent from the following description of a preferred embodiment of the apparatus.

BRIEF DESCRIPTION OF DRAWING

The single FIGURE of the accompanying drawing illustrates a diagrammatic view in block diagram form of an apparatus in accordance with the principles of the invention.

DESCRIPTION OF THE PREFERRED EMBODIMENT

Referring now to the drawing, illustrated therein is an embodiment of an apparatus for the input of parameters of a rotary member to be balanced, into an evaluation means of a balancing machine, which is incorporated into a balancing machine which is not fully illustrated herein. Thus, of the balancing machine, the drawing only shows components thereof which are required in relation to the input apparatus according to the invention. More specifically, the drawing shows a main shaft 1 of the balancing machine, on which a rotary member to be balanced can be mounted, for example by suitable clamping means, for the purposes of carrying out an unbalance measuring run. In the illustrated embodiment, the rotary member to be balanced is shown in the form of a motor vehicle wheel 11.

Reference numerals 15 and 16 indicate measurement value pick-up devices 15 and 16 for determining unbalance values during an unbalance measuring run, in respect of first and second balancing planes in which balancing weights may have to be fitted to the vehicle wheel 11 to compensate for unbalance thereof. That is a known procedure and will therefore not be described in greater detail herein. The signals outputted by the measurement value pick-up devices 15 and 16 are passed by way of respective analog-digital converters 9 and 10 to an evaluation unit 8 for the unbalance measurement values produced.

For the purposes of detecting the respective rotary angular position of the main shaft 1 and also for detecting the speed of rotation of the main shaft 1 during the unbalance measuring run, the apparatus has an angle sensor 2 which is for example in the form of an incremental sensor. The sensor 2 senses an angle sensor disc or target 12 which also rotates with the shaft and which is provided with suitable markings. The incremental sensor 2 and the disc 12 form an incremental sensor system for the respective angular positions of the main shaft 1. Which can be so designed that in continuous rotary angle steps of the main shaft 1, it supplies corresponding pulses. The pulses are passed to a rotary angle evaluation device 4 by way of a change-over switching device 3 which is in a first switching position a during an unbalance measuring run.

The rotary angle evaluation device 4 can also transmit corresponding information concerning the speed of rotation of the main shaft 1, to the evaluation unit 8. As already mentioned, the rotary angle sensor system may be an absolute value sensor or a rotary signalling device or synchro with analog-digital conversion means connected on the output side thereof.

After the termination of the unbalance measuring run, the detected unbalances are displayed in respect of magnitude and angular position at a display means 6, and then the unbalance compensating operation can then be carried out on the vehicle wheel 11, in dependence on the detected unbalance thereof.

The unbalance measuring system as described so far is known and suitable measuring systems are described for example in Hofmann News 7 (963211212/87) and Hofmann News 5 (09.85D).

Still referring to the drawing, the illustrated construction is such that the incremental sensor system for monitoring the rotary angle position and/or speed of rotation of the main shaft 1 and comprising the disc 12 and the sensor 2, is utilized for input of the parameter values in question. To effect that procedure, the switching means 3 is put into a second switch position as indicated at b in which a counting means in the form of an up-down counter 5 is connected to the incremental sensor 2 by way of a divider 7. The divider 7 can operate to set the step sizes which are suitable for the respective parameters being considered, for example inch or millimeter steps for the rim diameter and the rim width of a motor vehicle wheel. That ensures that the signal which is outputted by the incremental sensor 2 while the main shaft 1 is rotating, in respect of the respective parameter values to be inputted, is passed to the updown counter 5 in suitably prepared and processed form. In that connection, the divider 7 which thus acts as a preliminary divider determines the number of pulses from the incremental sensor 2 which trigger off a counting step in respect of the up-down counter 5. The respective parameter value in the counter 5 is displayed by the display means 6. That may be the same display means as is used when displaying the measured unbalance values. The display means is preferably in the form of a three-digit 7-segment display as is also conventionally used for unbalance display purposes.

So that the pulses supplied to the counter 5 from the incremental sensor 2 by way of the divider 7 can be detected in dependence on direction of rotation, the apparatus further includes a sensing means 14 which senses the direction of rotation of the main shaft 1 and suitably actuates the counter 5 so that the parameter value which is provided in dependence on the direction of rotation of the main shaft 1 is increased or reduced accordingly.

As soon as the display means 6 displays the desired parameter value in respect of the respective parameter to be inputted, for example parameter A (spacing of the rim from a stationary part 13 of the machine), the parameter B (width of the rim ) and the parameter D (diameter of the rim), the rotary movement of the main shaft 1 is stopped. The up-down counter 5 is blocked, which can be effected for example by releasing a key 17 which was depressed in the parameter input operation. The set counter condition is then taken over, as an input value in respect of the corresponding parameters A, B and D, by a suitable storage or memory region, in particular registers, of the evaluation unit 8 which in conventional manner may be in the form of a digital processor, and the set counter condition is then suitably taken into account in evaluation of the unbalance measurement values supplied by the measurement value sensors 15 and 16 of the apparatus.

In order to change the balancing machine over to input of the parameters being considered, the arrangement may include the key 17 which, when actuated, firstly causes a display of the instantaneously applicable parameter value. In order to prevent the value from being unintentionally altered, a condition bit is interrogated, which indicates whether the main shaft was or was not moving when the key 17 was depressed. If the main shaft 1 was still moving when the key was depressed, the counter condition is unaltered for the time being. It is only after the main shaft has been immobile for a short time that the counter is enabled. That can be effected for example by means of the sensing device 14 which also indicates the direction of rotation of the main shaft 1 in the part of the procedure involving input to the up-down counter 5. Input of the parameter values is now effected when the key 17 is depressed and by rotating the main shaft 1. As already described, the existing parameter value is then suitably increased or reduced, in dependence on the direction of rotation of the main shaft 1, until the desired parameter value is set at the display means 6.

In order to be able to alter if required the number of pulses supplied by the incremental sensor 2 for a respective counting step of the counter 5, for different parameters, it is possible to provide suitable keys by means of which the change-over switching means 3 can also be switched over between the first and second switching positions a and b thereof. However the switching operation may also be effected by the above-mentioned actuating key 17. It is also possible to replace the three keys referred to by the one key 17, in which case the sequence in which the key 17 is actuated also indicates the corresponding parameter to be inputted at the evaluation unit 8 so that the parameter values are supplied to the correct locations in the evaluation unit 8.

If the relationship between the angle of rotation of the main shaft 1 and the display value at the display means 6 should be nonlinear, for example when calling up special and test functions, the counter value in the counter 5 can be used as an indicator on a table. The value set down therein is then displayed.

It is also possible for the up-down counter 5 to be incorporated into the evaluation unit 8, as a program portion of suitable nature.

As indicated above, initial and terminal values may be fixed in respect of each parameter, and increments and step sizes as well as the initial and terminal values of the counting means may be easily adapted to the parameters to be inputted.

It will be appreciated that the foregoing description has been set forth solely by way of example and illustration of the principles of the present invention and that various modifications and alterations may be made therein without thereby departing from the spirit and scope of the present invention.

We claim:

1. A process for inputting at least one characteristic dimension parameter of a rotary member to be balanced into means for evaluating unbalance measurement values, comprising the steps of:
   monitoring a rotary angular position of a balancing machine main shaft;
   displaying a value of said characteristic dimension parameter and effecting a correspondence between the displayed value and the monitored rotary angular position of the main shaft;
   rotating the main shaft until a desired value is displayed; and
   transferring the desired characteristic dimension parameter value to the means for evaluating unbalance measurement values.

2. A process as in claim 1, wherein the displaying step comprises the step of displaying values of the characteristic dimension parameters when the main shaft is held stationary.

3. A process as in claim 1, further including the step of initiating the displaying step by displaying at least one of the most frequently occurring inputted characteristic dimension parameter value.

4. A process as in claim 1, further comprising the step of displaying at least one previously inputted characteristic dimension parameter values in response to an input request.

5. A process as in claim 1, wherein the displaying step sequentially displays incrementally increasing value of the characteristic dimension parameter while the main shaft is being rotated in a first direction and incrementally decreasing value of the characteristic parameter dimension while the mains haft is being rotated in a second direction.

6. Apparatus for inputting data relating to at least one dimension parameter of a rotary member to be balanced into means for evaluating unbalance measurement values for use with a balancing machine having a rotatably mounted main shaft to which the rotary member is mounted, said apparatus comprising:
   an angle sensor operatively connected to the main shaft to monitor the rotary angular position of the main shaft and for generating output signals in response to the monitored angular position,
   display means for displaying dimension parameter a values that have been made to correspond to certain rotary angular positions of the main shaft, operating means for receiving the output signals from said angle sensor and altering the displayed values in correspondence therewith, and routing means for selectively routine the output signals of said angle sensor to either a rotary angle evaluation unit or said operating means, so that upon rotation of the mains haft the displayed value for a desired dimension is changed until a desired value corresponding to the monitored angular position of the main shaft is displayed whereby the desired displayed value can be input into the evaluating means.

7. An apparatus as in claim 6, wherein said display means also displays unbalance measurement values from said evaluating means.

8. An apparatus as in claim 6, wherein said operating means comprises a dividing circuit connected to the output of said routing means for setting the output signals to a suitable step size for altering the displayed value.

9. An apparatus as in claim 8, further comprising means for detecting the direction of rotation of said main shaft, the detecting means generating an output signal responsive to the direction of rotation.

10. An apparatus as in claim 9, wherein said operating means further comprises an up-down counter, a first input of the up-down counter being connected to an output of said dividing circuit, a second input of the up-down counter being connected to said output signal of said direction detecting means, and an output of the up-down counter being connected to said parameter displaying means, wherein the up-down counter counts up or counts down, depending on the output of said direction detecting means and said dividing circuit.

* * * * *